Patented June 6, 1939

2,160,837

UNITED STATES PATENT OFFICE 2,160,837

MANUFACTURE OF COPPER PHTHALOCYANINE

Stanley R. Detrick, Gordon Heights, Wilmington, Del., assignor to E. I. du Pont de Nemours & Company, Wilmington, Del., a corporation of Delaware No Drawing. Application June 5, 1937, Serial No. 146,591

3 Claims. (Cl. 260—314)

This invention relates to an improved process for manufacturing copper phthalocyanine. More particularly, this invention deals with improvements in the process of manufacturing copper phthalocyanines from phthalonitriles and "copper bronze" (powdered copper).

It is an object of this invention to improve the reaction of phthalonitriles and copper whereby to render the same more controllable, enabling one to maintain the temperature of the reaction mass at a relatively low degree throughout the course of reaction. The net effect is a better yield and a product of higher purity than is obtainable by the direct heating together of phthalonitriles and copper. It is a further object of this invention to provide catalysts for use in the reaction of phthalonitriles and copper, whereby the reaction may be made to proceed in a shorter time and at a lower temperature, resulting in the advantages above noted. Other objects of this invention will appear as the description proceeds.

Ordinarily, phthalonitrile and "copper bronze" react between 230° and 240° C. The reaction becomes so vigorous that temperatures within the charge of 300° C. or more have been recorded. The high temperature obtained within the charge causes definite injury to the pigment, both in strength and brilliance.

The improvement according to my invention consists in the use of catalysts which will initiate the reaction as low as 160 to 170° C. By proper cooling of the reaction vessel from this temperature, the temperature of the charge may be maintained at a much lower point during the exothermic reaction. The lower charge temperature results in pigment of increased strength and brilliance.

I attain the objects of my invention by carrying out the reaction in the presence of a catalytic quantity of the chloride of an amphoteric metal or of ammonium; these chlorides have the common property of exhibiting an acid reaction when in aqueous solution. Examples of suitable chlorides are ammonium chloride, stannous chloride, stannic chloride, antimony trichloride, aluminum chloride and cuprous chloride.

By catalytic quantity I mean a quantity from about 0.5 to 3 parts by weight per 100 parts of the phthalonitrile compound. In the case of ammonium chloride and cuprous chloride larger quantities may be employed, say even up to 10% by weight of the entire reaction mass, since in these cases there is no danger of contaminating the reaction product with by-product metal-phthalocyanines. In the average case, I prefer to use from 1 to 2% of catalyst by weight of the entire mass.

It will be understood that although cuprous chloride, stannous chloride and aluminum chloride have been used in phthalocyanine synthesis before (see for instance British Patent No. 410,814), they have been used as sources of the respective metals for the purpose of producing the respective metal-phthalocyanines. Their quantities were correspondingly large, and the reaction temperature was relatively high (230–240° C.). In my invention I use these chlorides in catalytic quantities, and their object is not to serve as a source for the metal, but to catalyze the reaction between phthalonitriles and "copper-bronze" and initiate reaction at a temperature of about 180° C. or lower.

Likewise, in French Patent No. 799,901, the use of sodium chloride and potassium chloride was mentioned. But these were intended as diluents and were supposed to be used in correspondingly large quantities. I have found that when employed in catalytic quantities these chlorides fail to reduce the reaction temperature as do the catalysts above enumerated, and I ascribe this failure to the fact that they are salts of strong bases, and hence possess no acid reaction.

My invention is applicable to the synthesis of copper with phthalonitrile as well as nuclear derivatives of phthalonitrile, such as 3-nitro; 3-chloro; 3,6-dichloro; 4,5-dichloro; and 3-methyl phthalonitrile; or the dicyanides of naphthalene (e. g., 1,2-naphthalonitrile).

Without limiting my invention to any particular procedure, the following examples are given to illustrate our preferred mode of operation. Parts mentioned are by weight.

Example 1

25 parts phthalonitrile, 3.5 parts of "copper bronze' and 0.5 part of ammonium chloride were introduced into an enamel lined vessel immersed in an oil bath. Agitation was provided in both bath and tube. The temperature of the bath was raised rapidly to 145° C. and maintained at this point until the contents of the tube reached the same temperature. The temperature of the bath then was raised slowly (0.5° C. per minute) so that the temperature of the charge increased at the same rate. The bath temperature was maintained constant at the point where reaction occurs, (approximately the point at which the temperature of the charge becomes greater than the bath temperature). In most cases the formation of blue color precedes by about 5 or 10° C.

the point at which the temperature begins sharply to rise. In the case of ammonimum chloride, however, the formation of color and the sudden increase in temperature occurred at the same point, namely 176° C.

Example 2

25 parts of phthalonitrile, 3.5 parts of "copper bronze" and 0.5 part of stannous chloride were mixed and placed in the enamel lined vessel. The same process was followed as described in Example 1. The pigment began to form at 180° C.

Example 3

25 parts of phthalonitrile, 3.5 parts of "copper bronze" and 0.5 part of stannic chloride were heated in an enamel vessel. Same procedure followed as in Example 1. Pigment began to form at 185° C.

Example 4

25 parts of phthalonitrile, 3.5 parts of "copper bronze" and 1 part of antimony trichloride were heated in a glass vessel. Pigment began to form at 168° C., with a sharp increase in temperature at 180° C.

Example 5

25 parts of phthalonitrile, 3.5 parts of "copper bronze" and 1 part of aluminum chloride were heated in a glass vessel. Pigment formation began at 166–168° C. with a sharp increase in temperature at about 188°. C.

Example 6

25 parts of phthalonitrile, 3.5 parts of "copper bronze" and 0.5 part of cuprous chloride were heated in a glass vessel. Blue color was observed at 174° C.

For the purpose of comparison I am giving below a further example showing the course of the reaction when phthalonitrile and "copper bronze" are heated in the absence of my preferred catalysts.

Example 7

25 parts of phthalonitrile and 3.5 parts of "copper bronze" were placed in the glass tube and the reaction carried out as described in Example 1. There was a slight blue coloration of the charge at 200° C. but no evidence of a marked reaction. At 222° C., the temperature of the charge increased above the temperature of the bath. At 240°–244° C. a vigorous exothermic reaction occurred and the charge became solid. It can be seen from comparison of this and previous examples, that the initial temperature of reaction was lowered as much as 50° C. by the use of catalysts according to my invention.

It will be understood, of course, that my invention is not limited to the precise details above but may be varied widely within the skill of those engaged in this art. For instance, in lieu of phthalonitrile, substitution derivatives of phthalonitrile may be used, as already indicated above. Further, the reaction may be carried out in other types of apparatus such as a rotary baker, tray baker or a heated surface from which the resulting pigment may be continuously removed.

The use of the catalysts of this invention in the reaction between aromatic o-dinitriles and "copper bronze" permits the use of lower temperatures of reaction. This factor is most important in the case of plant size equipment of large heat capacity. Since the quality of the pigment is injured when subjected to high temperatures, it is of the utmost importance in a large piece of equipment to initiate the reaction at the lowest possible temperature. By so doing, the charge may be cooled sufficiently during the highly exothermic reaction, that the temperature never exceeds the optimum reaction temperature (around 170–185° C.). The ultimate advantage is the production of a brighter and stronger pigment.

I claim:

1. In the process of producing a copper-phthalocyanine by heating metallic copper with an o-arylene-dicyanide, the improvement which comprises adding to the reaction mass a catalytic quantity of an inorganic salt selected from the group consisting of ammonium chloride, stannous chloride, stannic chloride, antimony trichloride, aluminum chloride and cuprous chloride, whereby to initiate the reaction at a temperature between 160 and 180° C., and maintaining the reaction mass at a temperature below 180° C. throughout the course of the reaction.

2. A process as in claim 1, the catalyst being present in a quantity from about 0.5 to about 3% by weight of the entire mass.

3. The process of producing copper-phthalocyanine which comprises heating "copper bronze" and phtalonitrile in the presence of from 1 to 2% by weight of the entire mass of a catalyst selected from the group consisting of ammonium chloride, stannous chloride, stannic chloride, antimony trichloride, aluminum chloride, and cuprous chloride, whereby to initiate color formation at a temperature between 160 and 180° C., and maintaining the reaction mass at a temperature not exceeding 180° C. throughout the course of the reaction.

STANLEY R. DETRICK.